July 21, 1931.  C. B. RUSSELL  1,815,602
GASKET
Filed July 26, 1930

Witness:
Harold C. Barrett

Inventor:
Cass B. Russell
By Wm. O. Bell, Atty.

Patented July 21, 1931

1,815,602

UNITED STATES PATENT OFFICE

CASS B. RUSSELL, OF DETROIT, MICHIGAN, ASSIGNOR TO VICTOR MANUFACTURING & GASKET COMPANY, OF CHICAGO, ILLINOIS, A CORPORATION OF ILLINOIS

GASKET

Application filed July 26, 1930. Serial No. 470,852.

This invention relates to gaskets and while it is useful in many different kinds of gaskets it will be found particularly desirable in a cylinder head gasket for high compression engines. The cylinders of such engines are usually arranged as close together as they can be made and the gaskets are not only provided with cylinder openings but also with many water circulation openings and bolt openings, with the result that a relatively large gasket is of skeleton form with many comparatively narrow sections and is fragile in structure and may be easily distorted in shipping and in handling. It is important that the gasket should be maintained in its original flat condition of substantially uniform thickness and that it should be capable of conforming to any irregularity or unevenness in the faces of the head and the block to provide an efficient seal for the joint. It is also important that the edges of the gasket about the cylinder and water openings therein should be made strong and substantial to withstand the forces acting thereon in an engine, and at the same time these edges must always be sufficiently flexible and adaptable to seat properly and form a tight seal. It is, of course, more difficult to provide a gasket which will produce an efficient seal and stand up in use at the narrow sections between openings than at other parts, and this difficulty increases under conditions which produce increases in heat and pressure.

The objects of the invention are to provide a gasket of novel but simple construction which will form an efficient seal and will resist the forces to which a gasket is subjected in high compression engines, which has the stability required for maintaining it during shipping and handling in proper condition for use, which has uniform marginal edges about its openings for sealing purposes and which is sufficiently compressible about the sealing openings to enable the gasket to readily adapt itself to sealing pressure and conditions at the joint.

Figure 1:
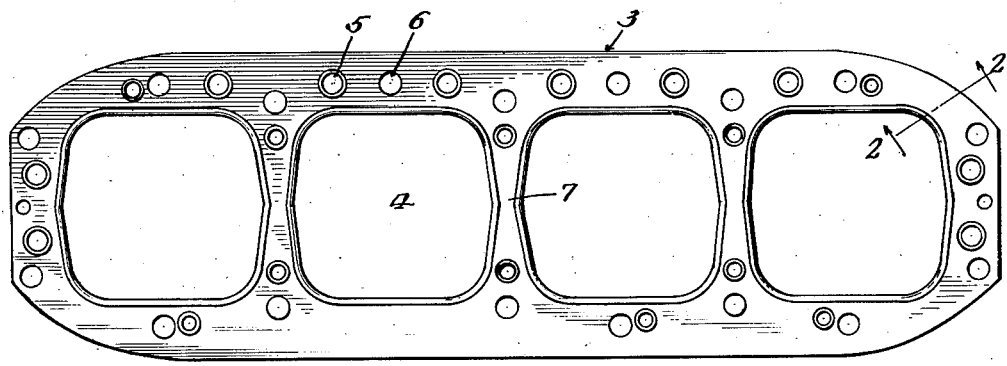
Figure 2:
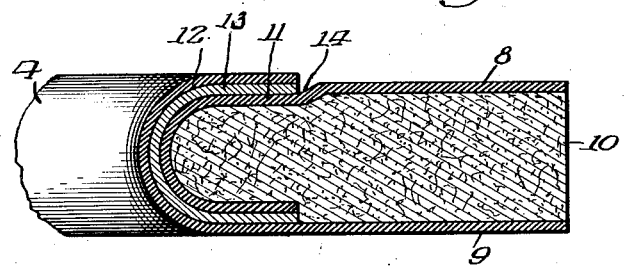

In the accompanying drawings I have illustrated the invention in a selected embodiment in one type of cylinder head gasket and referring thereto, Fig. 1 is a plan view of the gasket.
Fig. 2 is a sectional view on the line 2—2 of Fig. 1, and
Fig. 3 shows another embodiment.

Referring to the drawings the gasket 3 has a plurality of cylinder openings 4, water circulation openings 5 and bolt holes 6. The cylinder openings are located close together to conform with the block construction and they provide a number of narrow sections as indicated at 7 which may be even narrower in other gaskets than those shown in the gasket selected for illustration. The gasket comprises two outer or facing layers 8, 9 which are stamped from thin sheet copper or other metal or material suitable for the purpose, and a core or layer or filler 10 of asbestos or asbestos composition or other suitable heat-resisting material is interposed between the facing layers. The marginal edges of one facing layer, as 8, are bent to form flanges 11 about some or all of the openings in the gasket, preferably all of the cylinder and water openings; and the other facing layer, as 9, is similarly provided with flanges 12, these flanges being bent in opposite directions through the openings and overlapped upon each other. Substantially U-shaped reenforcing flanges 13 made of steel or other suitable metal or material are interposed between the overlapping flanges 11 and 12 and conform in shape therewith. These three flanges are nested close together and they extend away from the opening sufficiently to form flat three-ply sealing surfaces on both faces of the gasket about the openings therein. The flange 11 is preferably depressed at 14 to accommodate the flange 13 so that the gasket will not be much thicker through the overlapping flanges than at intermediate parts. The invention provides a strong and substantial triple or three-ply structure at the openings where the gasket is subjected to the severest test in actual use to resist the high degree of heat and the high pressure in maintaining the seal at the joint. Instead of arranging the reenforcing flange between the flanges on the facing layers as shown in Fig.

Figure 3:
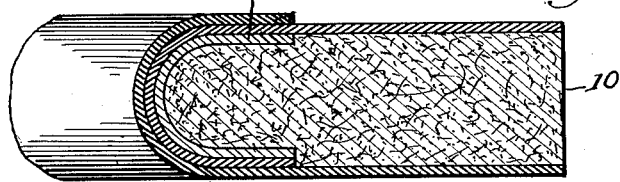

2 it may be arranged within the facing layer flanges as shown at 15 in Fig. 3, and in this construction the depression at 14 may be omitted. The facing layers will ordinarily be made of copper and the reenforcing flange 13 may be made of copper but will preferably be made of steel for greater strength and resistance, and it may be made of any material suitable for the purpose. This three-ply construction at the sealing margins about the openings in the gasket not only provides a strong and substantial structure but it also serves to strengthen the gasket throughout and give it greater stiffness and stability, and still enables sufficient compressibility of the gasket at the overlapping flanges to conform to the condition of the joint and to effect an efficient seal.

I have shown and described the invention as embodied in a particular form in one type of gasket but I do not thereby intend to restrict myself solely to this embodiment and wish it to be understood that I may change the form, construction and arrangement of parts of the invention for different gaskets and to meet different conditions within the scope of the following claims:

I claim:

1. A gasket having openings therein and comprising facing layers and an interposed layer of heat-resisting material, the facing layers having oppositely directed and overlapping marginal flanges binding the edges of said openings, and a reenforcing ring of a different material from that of the overlapping flanges interposed between said flanges and conforming in shape thereto.

2. A gasket having openings therein and comprising copper facing layers and an interposed layer of heat-resisting material, the facing layers having oppositely directed and overlapping marginal flanges binding the edges of said openings, and a metallic reenforcing ring nesting with said overlapping flanges.

3. A gasket having openings therein and comprising metal facing layers and an interposed layer of heat-resisting material, the facing layers having oppositely directed and overlapping marginal flanges binding the edges of said openings, said flanges extending back from the openings sufficiently to form flat sections about the openings on the sides of the gasket, and a reenforcing flange nesting therewith and extending back from the openings to form flat sections corresponding with the flat sections of the facing layers about the openings.

CASS B. RUSSELL.